3,267,047
PREPARATION OF A POLYURETHANE FOAM USING A MIXTURE OF A DIVALENT LEAD SALT AND A STANNOUS SALT AS CATALYSTS

George T. Gmitter, Akron, and Emery V. Braidich and Michael Kallaur, Cuyahoga Falls, Ohio, assignors to The General Tire & Rubber Company, a corporation of Ohio
No Drawing. Filed Apr. 27, 1960, Ser. No. 24,921
5 Claims. (Cl. 260—2.5)

This invention relates to polyurethanes and to methods for making the same. More particularly, it relates to polyetherurethanes, especially flexible, cellular or foamed polyetherurethane compositions or products, and to methods for making the same.

It has been observed that in the preparation of polyetherurethanes in large masses, the centers of the materials become crumbly (easily broken into small pieces, friable) and discolored during the curing process and after heat aging. This has become particularly noticeable in the manufacture of foams, such as flexible polyetherurethane foams, by a "One-Shot" process where all of the materials are mixed together at one time and then foamed, particularly where certain catalysts are used. It is not known precisely what causes the degradation of those foams although it may be due to the fact that the heat necessary to cause reaction plus the exothermic heat of reaction results in reversion of the material, possibly due to the catalyst, decomposition products of the catalyst and/or oxygen. Since the cellular masses produced themselves act as insulators, much of the heat is trapped for a considerable period of time which may facilitate this degradation or reversion. Even if the foams are otherwise satisfactory initially, they may seriously degrade when heated for extended periods of time. Thus, it would be highly desirable to provide a process or method whereby the degradation on curing and aging of polyurethanes can be avoided so that products are obtained which are not crumbly nor discolored after curing and heat aging.

It, therefore, is an object of the present invention to provide a method for making a polyetherurethane exhibiting improved resistance to heat degradation.

It is another object of this invention to provide a method for making a flexible polyetherurethane cellular or foam product, particularly by the "One-Shot" process, which exhibits improved dry heat aging and freedom from crumbling and discoloration.

Still another object is to provide a polyetherurethane having a high resistance to heat degradation so that the normal service life of the product is prolonged.

A further object is to provide a flexible polyetherurethane foam, cellular composition and/or product in which the center of the foam is non-crumbly and substantially free of excessive discoloration after curing and which exhibits little or no degradation after extended dry heat aging.

These and other objects and advantages of the present invention will become more apparent to those skilled in the art from the following detailed description and examples.

In accordance with the present invention it has been discovered that a minor amount of a combined form of a divalent Group IVb metal serves as an effective catalyst for the preparation of polyurethane foams, while at the same time protecting the polyurethane against heat degradation and the like.

The catalysts of the present invention which will be discussed in more detail hereinafter, obviate the addition of anti-degradants or other materials to prevent deterioration due to dry heat again. The catalysts of this invention are useful in the preparation of polyurethane foams whether a prepolymer technique is used or whether a "One-Shot" process is employed. Their utility is most pronounced, however, in the manufacture of "One-Shot" type polyurethane foams because the problem of heat degradation is not quite as serious in the preparation of polyurethane foams by the prepolymer technique.

In general, the prepolymer technique involves pre-reacting polyol and isocyanate with perhaps additional triol to form a prepolymer of considerable molecular weight. This prepolymer is relatively stable and may be shipped from the place of manufacture to the manufacturing operation wherein the foam is to be formed. To the prepolymer one may add additional hydroxyl containing materials to increase the crosslinking character and with blowing agents, for instance, water and/or chlorinated and fluorinated alkanes and the catalyst which in accordance with this invention is one containing a combined form of a divalent Group IVb metal. The combination of ingredients as just described will cause the material to foam spontaneously. This procedure as just generally described is usually most preferably employed in forming the rigid type foams as contrasted with the flexible or resilient type foams which are produced most advantageously with the advent of the catalyst of the present invention by the "One-Shot" technique. In this technique, the ingredients composed of polyol, isocyanate, water and catalyst, are conjointly mixed whereupon foaming occurs spontaneously. It can be seen that in one sense the "One-Shot" is a more rigorous and vigorous reaction in that polymer growth and foam formation occurs simultaneously whereas in the prepolymer technique, an appreciable portion of the polymer growth is achieved during the formation of the prepolymer.

The polyurethane foams manufactured in accordance with the present invention are superior to foams known heretofore because they do not exhibit crumbling after curing and after aging, or even after aging at elevated temperatures. For example, it has been found that foams known heretofore produced using the conventional amine type catalyst and the tetravalent metallo-organic catalyst have almost been universally found to undergo deterioration and degradation particularly in the center section of the foam where the heat build-up during the exotherm of the foam formation or caused by the post exposure to elevated temperatures is greatest. As indicated hereinafter this deterioration or degradation evidences itself in excessive discoloration and frangibility and crumbly areas. It is obvious that such would be highly objectionable from an appearance standpoint and most objectionable where it is being used as a cushioning material. Zones of a crisp or crumbly nature, of course,. affect the resilience of the foam and even lead to eventual sagging and collapse of a cushion in which this phenomenon occurs. The foams produced in accordance with the invention, on the other hand, are capable of enduring temperatures of 110–140° C. and higher for many days without any evidence of deterioration or degradation. While cushioning products are not normally used at these temperatures, this test serves to evaluate the long term stability of the product under accelerated conditions.

The catalyst of this invention has been found to be of utility in the manufacture of all types of polyurethane materials including rigid and semi-rigid foams, thermosetting and thermoplastic polyurethanes and also solid elastomeric polyurethanes serving in these materials to catalyze the urethane reaction while at the same time distributing a stabilizing function against heat degradation. These catalysts are also useful in urethane systems employing a major amount of a polyether and a minor amount of a polyester yielding a polyurethane containing a major amount of ether linkages as compared to the ester linkages.

The catalyst of the present invention may be most simply defined as materials containing a divalent Group IVb metal in combined form, e.g., as salts, salt-like compounds, complexes and the like. For purpose of this description all these will be referred to as salts.

The divalent Group IVb metal salts of carboxylic acids constitute one form of catalyst of this invention.

The Group IVb metals include: germanium, tin and lead according to "Modern Aspects of Inorganic Chemistry" by Emeleus and Anderson (1954), Van Nostrand Press.

By the term carboxylic acid salt, is meant, salts of such acids as acetic, propionic, butyric, valeric, caproic, enanthic, caprylic, pelargonic, capric, undecylic, lauric, myristic, palmitic, stearic, oleic, erucic, linoleic, linolenic, oxalic, malonic, succinic, glutaric, adipic, pimelic, suberic, azelaic, sebacic, malic, maleic, fumaric, tartaric, citric, benzoic, substituted benzoic, phthalic, etc.

The term carboxylic acid as contemplated in this description includes substituted acids and mixtures of acids so long as they function as acids and are capable of forming salts or salt-like compounds with the Group IVb metals.

Where monocarboxylic acids are concerned, those having more than four carbon atoms are advantageous because of their availability and low cost. Of the substituted benzoic acids, the hydroxy substituted benzoic acids, e.g., salicylic acids are preferred. The divalent Group IVb metal salts of carboxylic acids can be prepared by a variety of methods known in the art. Lead salicylate for example, may be prepared by treating a slurry of lead oxide (223 g.), water (1.2 liters), and lead acetate (0.5 g.) with powdered salicylic acid until a pH of 4.4 is reached followed by filtering and drying. See U.S. Patent 2,410,977. Stannous octoate, a Group IVb metal salt of caprylic acid is conveniently formed by combining tin oxide and caprylic acid, heating and drying to remove moisture.

Naphthenic acids are carboxylic acids within the purview of this invention although they are not completely pure. Naphthenic acids are derived from the distillation of crude petroleum. The divalent Group IVb metal salts of these acids exhibit the heat stabilizing character with respect to the polyurethane foam materials and are catalysts of the present invention.

Lead naphthenate which is a particularly preferred Group IVb metal salt is commercially available.

Another form of catalyst which includes a divalent Group IVb metal in combined form are the derivatives of the beta-diketones. These materials in the enol form may have the hydrogen atom of the hydroxyl group replaced by any divalent Group IVb metal to yield a complex product in which the metal is coordinated. Examples of the beta-diketones, are acetylacetone and acetoacetic ester, etc.

These salt-like materials may be prepared by the procedure described in more detail in Volume II, "Inorganic Synthesis," by W. C. Fernelius (1946).

Another salt-like catalyst which is perhaps more correctly referred to as a complex is exemplified by the compounds which are Group IVb metal derivatives of alkyl acetylacetates. These Group IVb metal complexes may be prepared by reacting the acetoacetic ester with the appropriate divalent Group IVb metal carbide. See "Organic Chemistry," by Frank Whitmore, 2nd Edition, Van Nostrand Press (1951).

Another group of salt-like materials which have utility as catalysts of this invention are the phenate salts of the divalent Group IVb metals. These have the formula:

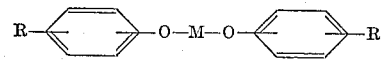

Where M represents the Group IVb divalent metal and R represents an alkyl substituent or hydrogen, R may be the same or different.

The divalent Group IVb metal salt is used in a minor amount by weight as compared to the polyol and as necessary to catalyze the reaction between the polyisocyanate and polyol(s) and to prevent dry heat degradation. While the amounts may vary over a relatively wide range depending on the molecular weight of the catalyst and/or polyol, large amounts are wasteful and may tend to change the physical properties desired in the resulting polyurethane. In general, from about 0.05 to 3.0 percent by weight of the divalent Group IVb metal salt catalyst based on the weight of the polyol present is used.

The divalent Group IVb metal salt catalyst is added either to the polyether or to an isocyanate modified polyether (a prepolymer.) It also may be added to the isocyanate provided none of the other reactants are present or to the other ingredients prior to the reaction forming the polyurethane. However, it can be added to all the ingredients at one time. This is especially desirable in the "One-Shot" process in which all of the polyurethane forming materials are mixed together at one time.

The products of the present invention may be solid, porous, flexible, rigid or semi-rigid. The degree of flexibility, rigidity and/or porosity depends on the degree of linearity or branching of the polyether or polyisocyanate and whether or not blowing agents are employed.

According to a particular embodiment of the present invention, a combination of catalysts is preferably used in the formation of the polyurethane foams. The particularly preferred combination of catalysts includes a tertiary amine, a divalent Group IVb metal naphthenate and another divalent Group IVb metal salt. The tertiary amines are described more fully hereinafter. It has been found that this combination of catalysts is most desirable in the "One-Shot" technique permitting production of foams of extremely low density, e.g., in the neighborhood of 1.5 pounds per cubic foot and lower.

It is believed that the divalent Group IVb metal naphthenate is an extremely rapid catalyst of polymer growth, in fact, much faster than the amine type catalyst. At the same time it catalyzes in conjunction with the amine catalyst, the isocyanate reaction (NCO—$H_2O$) yielding $CO_2$ gas which forms the cells and expands the mass. It has been found that this extremely active function of the Group IVb metal naphthenate with respect to polymer growth provides gelation or freezing of the polymer at the most opportune time in the growth of the foam through expansion of the $CO_2$ gas. While it has not been realized heretofore, it is believed that the time of gelation is an extremely critical one. It is especially important in producing low density foams.

If gelation of the polymer does not occur at the proper time in the course of foam expansion, the resulting foam may be deficient in several respects. Thus, if gelation is premature the foam will be more dense and will also tend to be less resilient. The foam will also possess a large proportion of closed cells which results in objectionable shrinkage. If gelation is late the foam will be likely to collapse and even if it forms it will be irregular in character and cell size. To obtain the optimum in foam properties and achieve the optimum in ease of processing and production, a three component catalyst system composed of a tertiary amine, lead naphthenate and stannous octoate is preferred. In general, branch chain polymers or a major amount of said polymers are employed to make foam products.

The polyether polyols (polyalkyleneether glycols) employed in the practice of the present invention may be obtained from alkylene oxides, substituted oxetanes, glycols, heterocyclic ethers and other materials by polymerization, copolymerization and the like. For example, tetrahydrofuran may be polymerized in the presence of catalytic amounts of fluorosulfonic acid to make polytetramethylene ether glycol having the formula

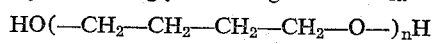

where $n$ is an integer. Glycols may also be polymerized in the presence of mineral acids, sulfonic acid or fuller's earth. Still other methods well known to those skilled in the art may be utilized in the preparation of these polyalkyleneether glycols. The linear polyalkylene ether glycols have at least three carbon atoms in their alkylene groups and can have as high as 8 or more carbon atoms in their alkylene groups. Useful examples of polyether glycols are polypropylene ether glycol, polyethylene-propylene ether glycol, polytetramethylene ether glycol, polypentamethylene ether glycol, polyhexamethylene ether glycol, poly-1,6-octamethylene ether glycol and the like mixtures thereof.

Branch chain polyether polyols may be obtained by reacting glycols or alkylene oxides or mixtures thereof and the like with materials such as sucrose, sorbitol, styrene-vinyl alcohol copolymers, hexanetriol, pentaerythritol, glycerol, phloroglucinol, trimethylol phenol, trimethylol benzene, trimethylol propane and the like. In making foams which are rigid, it is generally preferred to employ the low molecular weight branch chain polyether polyols, whereas in making flexible materials it is preferred to employ the high molecular weight branch chain polyols.

The average molecular weight of the polyether-polyols may vary from about 175 to 6500 or more. When making flexible polyetherurethane foams, it is preferred to employ branch chain polyethers having an average molecular weight of from about 600 to 6000 and at least 3 reactive hydroxyl groups. Mixtures of glycols and polyols may also be used.

In some polyurethane formulations it is not necessary to use crosslinking materials. However, when employed, they may contain from 2 up to 8 or more reactive hydroxyl radicals. Their molecular weight can be low or it can be as high as the polyethers disclosed hereinabove which can be employed and which are highly branched such as a reaction product of glycerol and propylene oxide or hexane triol and propylene oxide and the other polyether polyols mentioned above. Still other materials which can be used as crosslinking polyols are pentaerythritol, glycol, glycerol, trimethylol propane, phenyl trimethylol methane, 1,2,4-butanetriol, 1,1,1-trimethylol hexane, pentaerythritol monoleate, 1,4-butanediol, 1,2,6-hexane triol, N,N,N',N' - tetrakis (2 - hydroxypropyl) ethylene diamine, "Hyprose SP–80" (the reaction product of a sucrose with 8 equivalents of propylene oxide to give a compound having 36 carbon atoms and eight reactive hydroxyl groups—Dow Chemical Company) and the like. Mixtures of these materials are useful.

The polyethers should contain at least 3 carbon atoms between ether linkages to avoid water sensitivity. However, ethylene linkages can be used provided a substantial amount of the other linkages contain 3 or more carbon atoms. While unsaturated polyethers and polyols may be employed, it is much preferred to use materials which are saturated or essentially saturated. The polyethers, also, should be substantially or essentially hydroxyl terminated. It, moreover, is preferred that the OH groups be primary or secondary and it is even more preferred that the OH groups of the polyethers and crosslinkers be primary OH groups further to improve heat stability.

As pointed out hereinabove minor amounts of polyesters or polyester polyols may be used with the polyethers so long as the resulting polyurethane or polyurethane mixture contains a major or predominating amount of ether linkages as compared to ester linkages and so that the polyurethane is considered to be a polyether-urethane. The polyesters should be essentially or substantially linear and hydroxyl terminated, should have an average molecular weight of from about 600 to 3000 or more or should have an acid number less than 10 and preferably less than 3. The polyester is normally prepared by the esterification of at least one aliphatic dibasic acid or an anhydride thereof with at least one glycol. Ratios of more than one mole of glycol to acid are used so as to obtain chains containing a preponderance of terminal hydroxyl groups. The acids used in making the linear polyesters are generally aliphatic dicarboxylic acids having the formula HOOC—R—COOH where R is an alkylene radical having from 2 to 8 carbons. Preferably, these acids have the formula $$HOOC(CH_2)_xCOOH$$

where $x$ is a number from 3 to 8. The anhydrides of the acids can also be used. Mixtures of acids and their anhydrides may be employed. Some examples of dicarboxylic acids are adipic, succinic, pimolic, suberic, azelaic, and sebacic acids. The glycols used in making the linear esters generally contain from 4 to 10 carbon atoms. Preferably, in making linear polyesters, the glycols have the formula $HO(CH_2)_yOH$ where $y$ is a number from 4 to 8. Mixtures of the glycols can be employed and examples of useful glycols are butanediol-1,4 hexamethylenediol-1,6, octamethylenediol-1,8 and the like. The polyesters can also be made by transesterfication and other processes. Mixtures of polyesters can be employed.

Where branch chain polyesters are desired, they may be obtained by the reaction of polyols such as glycerol, hexanetriol, pentaerythritol and the like with dicarboxylic and other polycarboxylic acids.

The polyester, also, can be made with minor amounts of diamines or amino alcohols to provide the polyester with a small number of amide linkages and amine termination. However, the diamines or amino alcohols should be used in the amount of 25 mole percent or less so that the polyester contains a preponderance of ester linkages and a minor amount of amide linkages and is considered to be a polyester.

The glycerides of ricinoleic acid, castor oil, alkyl resins, etc., can also be utilized in minor amounts.

It is preferred that the polyester when used contain a substantial number of carbon linkages of at least 3 carbon atoms between ester linkages, be saturated, and contain primary or secondary OH termination, more preferably primary OH termination. Instead of using mixtures of polyesters and polyethers, these materials or mixtures of dicarboxylic acids and polyether-glycols and the like may be reacted together to form a composite polyetherester polyol containing a major or predominating amount of ether as compared to ester linkages. Mixtures of the various polyols disclosed herein such as polyethers, polyether-esters, polyethers-polyesters, and polyol crossing agents can be used in the practice of the present invention.

If the polyethers, polyesters, and polyols are impure or contain traces of catalysts, etc. which would tend to speed their reaction with polyisocyanates where fast reactions are not wanted, they may be washed or otherwise treated to reduce this activity. The polyisocyanates may be recrystallized or distilled to purify them.

The polyisocyanate used in the practice of the present invention may be any polyisocyanate having 2,3, or more functional or reactive isocyanato groups. They may be aromatic, aliphatic or aliphatic-aromatic compounds. Examples of useful polyisocyanates which may be employed are tolylene diisocyanate, p,p'-diisocyanate diphenylmethane, dimethyl diphenylmethane diisocyanate, bitolylene diisocyanate, bibenzyl diisocyanate, durene diisocyanate (2,3,5,6-tetramethylparaphenylene diisocyanate), diphenyl dimethyl methane diisocyanate, hexamethylene diisocyanate, naphthalene-1,5-diisocyanate, naphthalene triisocyanate, dichlorodiphenyl methane diisocyanate, metaphenylene diisocyanate, paraphenylene diisocyanate, diphenylene ether diisocyanate, and polyaryl polyisocyanates such as "PAPI" having the general formula:

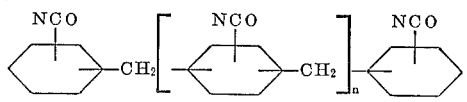

where $n$ has an average value of 1. Still other polyisocyanates can be employed. Mixtures of the polyisocyanate can be used, for example, an 80–20 or 65–35 mixture of 2,4-and 2,6-tolylene diisocyanates or other polyisocyanate mixtures can be used. A preferred class of diisocyanates to use including the tolylene diisocyanates has the general formula:

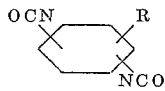

where R is selected from the group consisting of hydrogen, methyl, ethyl, propyl, isopropyl, butyl, amyl, hexyl, and the other lower molecular weight alkyl radicals.

The amounts of polyethers, crosslinker (if used) polyetherpolyester mixture and polyisocyanate employed depend on the degree of chain extension and crosslinking desired, as well as on the type of polyol or polyisocyanate used and the ultimate type of product desired and its properties. In general, in the practice of the present invention there can be employed from about 0.5 to 12 equivalents of isocyanate per equivalent of polyether hydroxyl or polyether-polyester (mixed) hydroxyl and from about 0.05 to 5 equivalents of polyol crosslinker hydroxyl per equivalent of polyether hydroxyl or polyether-ester (mixed) hydroxyl. The product of the present invention can contain residual hydroxyl or isocyanate groups or the reactants can be so balanced that the final product contains essentially no unreacted isocyanato and/or hydroxyl groups. In some instances a product containing residual isocyanato groups is obtained to take advantage of post curing when desired.

A small amount of water (about 0.5 to 5.0% by weight based on the weight of polyol present) as a blowing agent can be added to the reaction mixture to make foam. It can be mixed with the other reactants at the same time in a one-step foaming process. The water may first be added to the polyether or polyetherester but can be introduced to the foaming nozzle at the same time as the other ingredients. If a prepolymer is to be made, it is desirable that the reactants be substantially anhydrous to avoid the formation of urea groups so that in this case the water should be added at about the time of foaming. Lithium aluminum hydride can be used with water as a blowing agent. In place of water or water activated materials, other blowing agents can be used such as the liquid fluoro- or chlorofluoroalkanes (the "Freons"), liquefied hydrocarbon gases, such as methane, ethane and the like as shown in prior copending application of Charles B. Frost, Serial No. 803,381, filed April 1, 1959, now U.S. Patent No. 3,072,582, entitled "Polyetherurethane Foams and Method of Making Same." Mixtures of the liquefied gases can be used. Mixtures of water and the "Freons" may likewise be used. The liquid organic blowing or foaming materials may be used in an amount of from about 2 to 40%, preferably from 9 to 30%, by weight based on the total weight of the polyurethane forming materials.

When water is added to the urethane reaction mixture to effect blowing, it is desirable, but not absolutely necessary, to also employ amine catalysts to facilitate reaction between the isocyanate radicals and the water hydroxyl. Useful amine catalysts are the tertiary amines, for example, triethyl amine, 4-n amyl pyridine, trihexyl amine, N-methyl morpholine, 4-pyridine propanol, 2-ethanol pyridine, di(ethylene amino ethanol) adipate, dibutyl amino ethanol, N,N'-diethyl-2-methyl piperazine and the like. These amine catalysts are generally used in an amount from about 0.05 to 2.5% by weight based on the total weight of the polyol used although other amounts may be employed. It generally is preferred to employ just the amount of amine needed to obtain the desired rate of reaction to avoid waste of the catalyst, to reduce the possibility of deterioration of the product and to reduce the odor level.

Other additives may be added to the reaction mixture of the present invention, such as the silicones including the siloxane-oxyalkylene block copolymers and silicone oils as shown in copending applications of George T. Gmitter and Edwin M. Maxey, Serial No. 790,323, filed February 2, 1959, and entitled "Polyurethane Foam and One-Step Method of Making Same," and of George T. Gmitter, Serial No. 707,351, filed January 6, 1958, now abandoned, for "Process for Producing Cellular Polyetherurethane Elastomers Using Silicone Oils." Other silicones or silanes such as vinyl triethoxy silane, butyl triethoxy silane, amyl triethoxy silane and other monomeric and polymeric organic silanes and silicones and the like are useful in the practice of the present invention. Only small amounts of silicones should be used with the polyetherpolyester type foams while much larger amounts can be used with the polyether type. The emulsifiers, if used, are preferably anionic or nonionic and also preferably are nonacidic or substantially nonacidic. Wetting agents, carbon black, $TiO_2$, $SiO_2$ containing materials, wood flour, metal flakes, organic and inorganic synthetic and natural fibers (wool, cellulose, nylon, glass, etc. (surface treated or not)), color pigments and dyes, antioxidants, antiozonants, deodorants, fungicides, plasticizers, rubbers, resins, fire retardants and so forth, also, are useful additives in the reaction mixture. If a foam is to be made using water, the water can be added in the form of a natural or synthetic rubber and/or resin latex.

As pointed out above, antioxidants, antiozonants and/or antidegradants can be used but are not necessary since a feature of the present catalyst is that it combines both catalytic and antidegradant properties. However, if desired, antidegradants can be used such as alkyl substituted phenols, N,N'-dialkyl substituted phenylene diamines, alkyl and aryl phosphites and the like. Halogenated organic phosphites, such as halogenated aryl, alkyl, alkaryl, aralkyl and cycloaliphatic phosphites and the like and mixtures thereof can also be employed as shown in copending application of George T. Gmitter, Serial No. 810,992, filed May 5, 1959, now abandoned, and entitled "Compositions and Methods of Making the Same." Still other antidegradants can be used.

In making the products of the present invention the polyisocyanate may be reacted with the polyether or polyether-polyester mix, etc., and then a crosslinker as desired to form a finished product. However, the polyisocyanate may first be reacted with the crosslinker preferably in the presence of the divalent Group IV$b$ metal salt and then with the polyether. A prepolymer of a polyether and polyisocyanate may be formed using the catalyst of this invention. Also, it is not necessary always to use the crosslinker but by proper selection of the polyether employed it will only be necessary to react the polyisocyanate with the polyether or polyether-polyester mixture etc., to obtain the desired products. The use of the divalent Group IV$b$ metal salt catalyst is particularly effective in a "one-shot" process where all of the ingredients are pumped (and heated as necessary) to the nozzle of a foaming machine where they are intimately mixed together and then delivered or dumped into pans or forms wherein the reaction mixture is allowed to foam and cure. Heat is applied as necessary to insure the proper reaction, chain extension, crosslinking, cell formation and vaporization or decomposition of the blowing agent. After curing, the foam can be either heated or aged as desired to improve its properties. Such aging may be conducted in a moist atmosphere. Furthermore, the flexible foams are usually conveniently squeezed or wrung after curing to break the cell walls to increase their moisture vapor transmission and their resilience in some instances. If heated, during the squeezing operation, some of the catalyst or catalyst products or residues may be evolved if vaporizable and not trapped within the polyurethane itself.

The products of the present invention are useful in making rubbery, resilient, flexible, semi-rigid, rigid, cellular (open or closed cell) or non-cellular, gum and other polyurethanes and the like. They also, may be thermoplastic or thermosetting and can be made into liquid form for casting purposes or as adhesives. Films or coatings, molded goods and extrusions can be made from the materials of the present invention. Some specific examples of useful articles which can be made from the products of the present invention are shoe heels and soles, belts, bumpers, carpet underlays, pallet rollers, tires, coated tarpaulins, pillows, potting compounds, insulated boots, mattresses, cushioning for furniture, and door panels; insulation for food containers, refrigerators, and inaccessible pipe clusters; sandwich construction for panels, walls of buildings, vehicles, and the like; buoyant elements for boats, buoys, life rafts and life preservers; light-weight reinforcing material for aircraft, etc.

It is appreciated that the prior art has suggested various and sundry types of metallo-organic compounds as catalysts for polyurethane foams. None of these prior art teachings, however, have suggested the specific catalyst of the present invention. The most commonly used type of metallo-organo catalyst are the organo tin compounds. These materials are, for instance, di-butyl-dilaurate, dibutyl tin diacetate, etc. A number of such tin catalysts are described in South African Patent 4,618/58. We have found that foams produced using catalysts such as disclosed in this South African patent are very prone to heat degradation and users of these materials have had to resort to various antidegradants and stabilizers in order to overcome the deterioration caused by the tin catalyst. The tin catalysts just described are to be distinguished from the divalent tin catalysts disclosed in copending application Serial No. 24,899, filed April 27, 1960, now U.S. Patent No. 3,148,162, assigned to the same assignee as the present application.

It is not precisely known how the divalent Group IV$b$ metal salt catalysts or their residues prevent or retard heat aging of polyurethanes during and after curing. In particular, with reference to foamed urethanes, it will be appreciated that the foams have relatively high exotherms. That is, the exothermic heat of reaction is relatively high, and since the foam acts as an insulator, this heat plus any heat applied to initiate foaming and curing does not readily escape, yet in such situations the aromatic tin catalyst or its residue prevents heat degradation. In the presence of other catalysts under these heating conditions and without any anti-degradant, reversion or decomposition of the foam occurs apparently due to and accelerated by the other catalysts or to some decomposition products of the other catalysts under the conditions existing. On the other hand the divalent Group IV$b$ metal salt catalyst of this invention may serve to resist a possible free radical mechanism type degradation. The catalyst of this invention, also, may react with the polyurethane itself in such a fashion that it reunites urethane, ester or ether bonds as fast as they are broken. The catalyst or its residue if it breaks down may also be acting as a powerful antioxidant. In any event whatever may be the true explanation, it has been found that the use of these divalent Group IV$b$ metal containing catalysts greatly retards the decomposition of polyurethanes; particularly it prevents the decomposition of flexible polyether foams during foaming and curing and even after extended dry heat aging so that the discoloration and crumbling obtained on curing or heat aging are not observed. Even when aromatic diisocyanates which normally give discolored products on heat aging are used, the degree of discoloration is greatly minimized.

The following examples will serve to illustrate the invention with more particularity to those skilled in the art:

Example 1

This example illustrates the formation of a rigid type foam using a prepolymer technique. The foam is produced using the following initial prepolymer composition:

| Ingredients: | Parts by weight |
|---|---|
| Niax triol, LHT-240 (a propylene oxid adduct of 1,2,6-hexanetriol hydroxyl number 240) | 100 |
| Hexanetriol 1,2,6 | 17.93 |
| Tolene diisocyanate (80/20 mixture of 2,4 and 2,6-toluene diisocyanate) | 255 |
| Tri (2-chloroethyl) phosphite | 0.75 |
| Benzoyl chloride (pH control) | 0.06 |

To prepare the prepolymer, TDI is charged to a reactor followed by the benzoyl chloride and phosphite and finally the propylene oxide adduct and the hexanetriol. When the last ingredient has been added and stirring commenced, the temperature of the mixture begins to rise and level off at 190° F. Some heat is applied to maintain the temperature of the reaction between 190° and 200° F. for about 1½ hours or until the reaction mixture contains 24.0% NCO. This is a convenient measure of the amount of reaction that has occurred between the isocyanate and the polyol. The resulting prepolymer, having a molecular weight of about 3000 is now combined with other foam components according to the formulation shown below:

| Ingredients: | Parts by weight |
|---|---|
| Prepolymer | 180 |
| Sorbitol 10 (a propylene oxide adduct of Sorbitol, $C_6H_{14}O_6$, having a hydroxyl number of about 490) | 53.0 |
| LK-380-triol (a propylene oxide adduct of polyols having a hydroxyl number of 380) | 74 |
| Trichlorofluormethane (Freon-11) | 60 |
| Lead naphthenate | 0.7 |

The above ingredients were conjointly poured into a mold whereupon they foamed spontaneously to fill and overflow the mold. Thereafter the raised foam material was cured for 15 hours at 100° C. The foam upon examination revealed itself to be of uniform cell size and having a density of 1.50 lbs./cu. ft. A section taken through the foam revealed it to be uniform throughout, particularly with respect to cell size. There were no voids or areas of discoloration or objectionable frangibility. Additional samples of an identically prepared foam were aged in a dry heat oven at 158° F. Compressive strength tests showed no loss of strength after 1-, 2-, and 4-weeks' exposure.

Example 2

The procedure and formulation of Example 1 was repeated except that in place of the divalent lead naphthenate there was substituted 0.1 part of tetravalent dibutyl tin dilaurate and 0.4 part tetramethylbutanediamine-1,3. While this foam formulation foamed satisfactorily, the cured sample when cut revealed zones of discoloration and frangibility, particularly after exposure to temperatures above 158° F. Furthermore, the foam continued to degrade in these areas the longer it was exposed to these temperatures leading finally to crumbling of the foam.

Example 3

The procedure and formulation of Example 1 was repeated except that in the foam composition and formulation, there was substituted for the lead naphthenate, 1.0 part of stannous octoate (28% active tin).

The resulting foam had similar properties to the foam of Example 1 and particularly was able to withstand exposure to dry heat without deterioration.

Example 4

This example illustrates the practice of the invention using the "One-Shot" technique in making a flexible foam. The following formulation was used:

| Ingredients: | Parts by weight |
|---|---|
| Dow triol 112–3 (a propylene oxide adduct of glycerol capped with ethylene oxide with a molecular weight of approximately 3000) | 75 |
| A polyalkylene oxide polysiloxane block copolymer | 1 |
| Tetramethylbutanediamine-1,3 | 0.08 |
| Toluene diisocyanate (80/20 mixture of 2,4- and 2,6-toluene diisocyanate) | 27.5 |
| Water | 2.2 |
| Stannous octoate (28% active tin) | 0.3 |

The above ingredients were introduced into the nozzle of a foaming machine where the ingredients were thoroughly mixed and issued from the nozzle into a pan where foaming occurred. After the foam had risen in the space of 2 or 3 minutes to its full height, it was cured by maintaining it at a temperature of 100° C. for 60 minutes. Thereafter the flexible foam product was crushed by passing between rollers having a clearance of about 25–40% of the thickness of the foam to thereby produce an essentially 100% open cell structure. The foam was then tested to determine the following properties: density, rebound and 25% compression deflection. The density measured 1.70 lbs./cu. ft., the Shopper rebound was 40% and the compression deflection was 0.5 lbs./sq. in. A cut section taken of the foam revealed it to be of uniform character throughout and also of uniform cell size. There was no discoloration or crumbling. A sample of the foam was placed in a dry heat oven maintained at 100° C. The sample was checked periodically and even after 30 days revealed no deterioration. The polysiloxane copolymer used in this and succeeding examples and identified in the above formulation as a polyalkylene oxide polysiloxane block copolymer has the general formula:

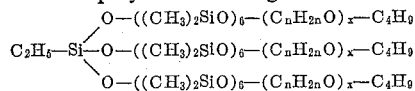

where $(C_nH_{2n}O)_x$ is a mixed polyoxethylene-oxpropylene block containing about 17 oxyethylene and 13 oxypropylene units.

This product is available from the Silicones Division of Union Carbide. Other siloxane copolymers as described in application Serial No. 790,323 may, of course, be substituted for the one in the formula. Thus, the ethyl, methyl and the butyl groups above may be replaced by other alkyl groups and may be mixtures of alkyl groups.

Example 5

The procedure and formulation of the preceding example was repeated except that in place of the stannous octoate there was substituted an equal amount by weight of lithium stearate. The lithium stearate proved to be an inactive catalyst. In addition, the foam was appreciably shrunk as compared to the foam using the stannous octoate.

Example 6

This example represents the practice of the invention by the "One-Shot" technique to form a flexible foam. The foam was made from the following formulation:

| Ingredients: | Parts by weight |
|---|---|
| LG–56 (a propylene oxide adduct of glycerol, hydroxyl No. 56) | 100 |
| A polyalkylene oxide polysiloxane block copolymer | 0.9 |
| Water | 3.5 |
| Toluene diisocyanate (80/20 mixture of 2,4- and 2,6-toluene diisocyanate) | 45 |
| Cyclic triethylenediamine | 0.08 |
| Lead salicylate | 0.5 |
| Dimethyl-2-amino propanol | 0.4 |

The foregoing ingredients were combined in a container and mixed with a high speed hand mixer. When thoroughly mixed they were quickly poured into an open top half gallon paperboard container and allowed to rise. After further curing at 250° C. for 2 hours, the container was stripped from the foam and the foam was passed between rollers to wring the foam to form an open cell structure. The foam was found to have a density of 1.82 lbs./cu. ft. and a Shopper rebound of 45% and a 25% compression deflection of 5.25 lbs./10 sq. in. Examination of a section of the foam revealed no weaknesses or discoloration in the center. An identically prepared sample was placed in a hot air oven and maintained at 140° C. and after 7 days the sample when cut revealed no crumbling, weaknesses or excessive discoloration. By comparison, a similar product in which dibutyl tin dilaurate was used in place of the lead salicylate, while revealing similar initial physical properties, was very unstable on exposure to dry heat. Thus, a sample of this foam became crumbly and broken up after four (4) hours in the 140° C. hot air oven. The propylene oxide adduct of glycerol identified in the above formulation as LG–56 contains 90–95% secondary hydroxyl groups. It differs from the propylene oxide adduct of glycerol used in some of the other examples and identified as Dow triol 112–3, in that the latter having been capped with ethylene oxide results in a polymer having end groups which are of primary hydroxyl functionality.

Example 7

The formulation and procedure of the preceding example was carried out except that an equal amount of monohydroustribasic lead maleate was substituted for the lead salicylate. The properties of this foam were very similar to the foam of the preceding example. In particular, the foam was found capable of enduring exposure to the warm air oven maintained at 140° C. for an excess of 7 days. Even after this exposure a cut sample of the foam revealed no excessive discoloration nor any weaknesses or evidences of crumbling.

Example 8

To illustrate the practice of the invention using the "One-Shot" technique in making a flexible foam and to also illustrate the superiority of the particular catalyst of the invention, there were prepared two separate foams utilizing the following formulation in which the parts are given by weight unless otherwise noted:

| Ingredients | Foam A | Foam B |
|---|---|---|
| LG–56 triol (a propylene oxide adduct of glycerol, having a hydroxyl no. of 56) | 100 | 100 |
| Dibutyl tin di-2-ethyl hexoate | | .2 |
| Stannous octoate | .4 | |
| A polyalkylene oxide polysiloxane block copolymer | 0.6 | 0.9 |
| N-methyl morpholine (catalyst) | 0.6 | 0.6 |
| Toluene diisocyanate (80/20 mixture of 2,4- and 2,6 toluene diisocyanate) | 45 | 45 |
| Water | 3.5 | 3.5 |
| Cyclic triethylene diamine | 0.15 | .08 |

The ingredients listed in the formulation above were introduced simultaneously into the nozzle of a foam machine where the ingredients were thoroughly mixed. From the nozzle the mixture of ingredients flowed down into a shallow pan where the foam was allowed to expand under ambient conditions.

The foam had risen to its full height in each case within 2 or 3 minutes with the exception of Foam B which was somewhat slower in reaching its full height. When the foams had reached their full height they were placed in a warm oven maintained at about 250° C. and allowed to cure there for about two hours. Thereafter the foams were each crushed by passing the slab of foam between a pair of rollers in spaced relationship with a surface clearance of about 25–40% of the thickness of the foam. This crushing or so-called "wringing" yields a foam having a more open cell structure than would occur otherwise. Foam A had a density of 1.75 lbs./cu. ft. Foam B had a density of 1.68 lbs./cu. ft.

Foam A was further examined by cutting it through the middle to reveal the structure of the foam throughout its thickness. The foam had an excellent uniform even-celled appearance with no evidence of crumblyness when poked with a finger.

Foam B, on the other hand, showed slight evidence of discoloration and was very slightly crisp to the touch at certain areas in the center.

Examples of each of the Foams A and B were next placed in an oven maintained at 284° F. After four hours the foams were removed and examined. Foam B was found to be almost completely degraded in that it was more discolored and was quite crisp in certain areas to the extent that it would crumble when compressed between fingers. Foam A on the other hand, was only slightly discolored and had not changed at all in resilience or softness. Foam A was returned to the oven and was found capable of enduring three weeks' exposure to the effects of the furnace before it evidenced any degradation.

Another series of tests were conducted wherein specimens of Foams A and B were placed in an oven maintained at 250° F. for a period of 4 weeks. At the end of each week the samples were removed and their percent change in tensile strength, elongation and compression load were noted. The results of this test are given in Table I below:

TABLE I
[Percent change in properties at 250° F.]

| | Tensile Strength | | Elongation | | Compression Load | |
|---|---|---|---|---|---|---|
| | Foam A | Foam B | Foam A | Foam B | Foam A | Foam B |
| 1 week | +12.5 | −52.5 | +19.0 | −57.7 | +9.2 | −15.0 |
| 2 weeks | −7.4 | −52.5 | +4.2 | −49.9 | +4.3 | −18.0 |
| 3 weeks | −5.0 | −49.2 | +4.2 | −43.6 | −3.0 | −12.3 |
| 4 weeks | −17.6 | −47.0 | −7.3 | −50.8 | −4.0 | −13.0 |

The results in the foregoing table reveal quite clearly the superiority of Foam A as compared to Foam B. Thus, Foam A containing Group IV$b$ metal salt was able to withstand the exposure to the severe temperature of 250° F. for an extended period without material loss of strength. In contrast, Foam B containing the tetravalent tin catalyst showed an initial loss of tensile and elongation in excess of 50% the first week and continued to demonstrate loss of strength over the period of the test.

*Example 9*

The following formulation wherein a three component catalyst system is utilized demonstrates a particularly preferred embodiment of the present invention. The formulation given below was incorporated into a "One-Shot" technique to form a flexible polyether type urethane foam.

Ingredients: Parts by weight
LG–56 triol (a propylene oxide adduct of glycerol, having a hydroxyl No. of 56) ____ 100
Toluene diisocyanate (80/20 mixture of 2,4 and 2,6 toluene diisocyanate) _____ 45
Water _____ 3.9
Stannous octoate (28% active tin) _____ 0.3
N-methyl morpholine _____ 0.6
Tetramethylbutanediamine 1,3 _____ .05
Lead naphthenate _____ 0.15
A polyalkylene oxide polysiloxane block copolymer _____ 2.6

The foregoing listed ingredients were introduced simultaneously into the nozzle of a foaming machine to effect complete mixing thereof. The mixed material then flowed immediately into a shallow pan and were allowed to expand without any confinement. The foam had risen to its full height within 2 or 3 minutes after which it was cured by exposure to a temperature of about 100° C. for one hour. Thereafter the foam was crushed by passing it between parallel rollers spaced to define a passage measuring about 25–40% of the thickness of the foam as expanded. This so-called "wringing" of the foam produced an essentially 100% open cell structure. The resulting flexible foam was found to have a density of 1.6 lbs./cu. ft. Further examination of the foam revealed it to be of extremely uniform cell size and soft and resilient to the touch. Samples of the foam were placed in a hot oven maintained at 140° C. After 15 days further examination of the foam revealed no excessive discoloration. Cut samples of this heat aged foam showed no evidences of physical deterioration in the interior thereof, the center remaining extremely soft and resilient to the touch.

It is to be understood that in accordance with the provisions of the patent statutes, the particular form of composition or product shown and described, the particular procedures set forth and the recitation of examples are presented for purposes of explanation and illustration and that various modifications of said composition or product and procedure can be made without departing from this invention.

Having thus described the invention, what is claimed is:

1. The method of producing a polyurethane foam which comprises reacting (1) at least one organic polyisocyanate with (2) at least one polyol selected from the group consisting of a polyether polyol, and a mixture of a major amount of a polyether polyol and a minor amount of a polyester polyol and containing at least 2 active hydroxyl radicals in amounts sufficient to form a polyurethane in the presence of (3) a minor amount by weight, based on the total weight of polyol present and sufficient to catalyze the reaction between said polyisocyanate and said polyol of a catalyst comprising a mixture of divalent lead salts of a carboxylic acid and a member of the class consisting of stannous octoate and stannous oleate and a blowing agent.

2. The method according to claim 1 in which said polyol is a branch chain polyalkylene ether polyol having at least 3 reactive hydroxyl groups and an average molecular weight of from about 600 to 6,000 and said organic polyisocyanate is an aromatic diisocyanate.

3. The method according to claim 2 in which the reaction of said polyisocyanate and said polyol is conducted additionally in the presence of a tertiary amine catalyst in an amount of from 0.05 to 2.5% by weight based on the weight of said polyol.

4. The method according to claim 3 in which the catalyst is a mixture of lead naphthenate and stannous octoate.

5. The method in accordance with claim 4 which contains additionally a blowing agent.

References Cited by the Examiner
UNITED STATES PATENTS

| 2,374,136 | 4/1945 | Rothrock _____ 260—75 |
| 2,866,774 | 12/1958 | Price _____ 260—2.5 |
| 2,897,181 | 7/1959 | Windemuth _____ 260—75 |
| 2,933,462 | 4/1960 | Fischer _____ 260—2.5 |
| 2,948,691 | 8/1960 | Windemuth et al. _____ 260—2.5 |
| 3,044,971 | 7/1962 | Polis _____ 260—77.5 |

FOREIGN PATENTS

| 205,456 | 1/1957 | Australia. |
| 769,681 | 3/1957 | Great Britain. |

(References on following page)

OTHER REFERENCES

Mobay publication: Tech. Inform. Bul.; 3 pages TIB No. 24–F8, April 27, 1959.

Mobay publication: Tech. Inform. Bul.; 3 pages, TIB No. 28–F9; July 20, 1959.

Remy: "Treatise on Inorganic Chemistry" volume I, page 409; published 1956; Elsevier Pub. Co.; New York and Houston.

LEON J. BERCOVITZ, *Primary Examiner.*

DANIEL ARNOLD, *Examiner.*

D. E. CZAJA, *Assistant Examiner.*